US012695746B2

(12) United States Patent
Wang et al.

(10) Patent No.: US 12,695,746 B2
(45) Date of Patent: Jul. 28, 2026

(54) COMPUTING CLUSTER SYSTEM, SECURITY AUTHENTICATION METHOD, NODE DEVICE AND STORAGE MEDIUM

(71) Applicant: Cloud Intelligence Assets Holding (Singapore) Private Limited, Singapore (SG)

(72) Inventors: Xining Wang, Beijing (CN); Yang Liu, Shanghai (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 95 days.

(21) Appl. No.: 18/694,835

(22) PCT Filed: Sep. 13, 2022

(86) PCT No.: PCT/CN2022/118478
§ 371 (c)(1),
(2) Date: Mar. 22, 2024

(87) PCT Pub. No.: WO2023/064925
PCT Pub. Date: Apr. 20, 2023

(65) Prior Publication Data
US 2025/0007913 A1     Jan. 2, 2025

(30) Foreign Application Priority Data

Sep. 28, 2021    (CN) .......................... 202111146547.9

(51) Int. Cl.
*H04L 9/40*              (2022.01)
(52) U.S. Cl.
CPC ...... *H04L 63/0876* (2013.01); *H04L 63/0823* (2013.01); *H04L 63/0884* (2013.01)
(58) Field of Classification Search
CPC .................................................. H04L 63/0876
See application file for complete search history.

(56) References Cited

U.S. PATENT DOCUMENTS 10,922,284 B1    2/2021  Venkatasubramanian et al.
11,012,233 B1 *  5/2021  Uhr ......................... H04L 9/321
(Continued)

FOREIGN PATENT DOCUMENTS

CN        109218100        1/2019
CN        110781476        2/2020
(Continued)

OTHER PUBLICATIONS

English Translation of International Search Report for International PCT Patent Application No. PCT/CN2022/118478 mailed Dec. 13, 2022 (8 pages).

(Continued)

*Primary Examiner* — Bradley W Holder
(74) *Attorney, Agent, or Firm* — Osha Bergman Watanabe & Burton LLP

(57) ABSTRACT

A computing cluster system, a security authentication method, a node device and a storage medium are provided. A service grid system for implementing an identity-based identification authorization mechanism between at least two services is added in the computing cluster system. In the system, an identity registration component reports, to a management and control component, acquired diversified identity data corresponding to a first service; according to the diversified identity data, the management and control component generates a security policy and a digital certificate, which correspond to the first service, and issues same to a corresponding authorization proxy component. The authorization proxy component performs identity verification for the corresponding service according to the security policy and the digital certificate, and performs communication for the at least two services by proxy after the identity verification is passed.

19 Claims, 4 Drawing Sheets

(56) References Cited

U.S. PATENT DOCUMENTS

2009/0328141 A1 *  12/2009  Zhang ..................... G06F 21/31
                                                          726/2
2017/0331828 A1 *  11/2017  Caldera .............. H04L 63/0807
2020/0403992 A1 *  12/2020  Huffman .............. H04W 12/12

FOREIGN PATENT DOCUMENTS

CN      111865920      10/2020
CN      113886794       1/2022

OTHER PUBLICATIONS

"Istio Series 1: Analysis of Istio's Authentication Authorization Mechanisms," Green Union Technology Research Communications, https://cloud.tencent.cn/developper/article/1552141, pp. 1-13, Dec. 11, 2019).
English Translation of First Office Action issued in corresponding Chinese patent application No. 02111146547.9, mailed Apr. 30, 2025 (18 pages).

* cited by examiner

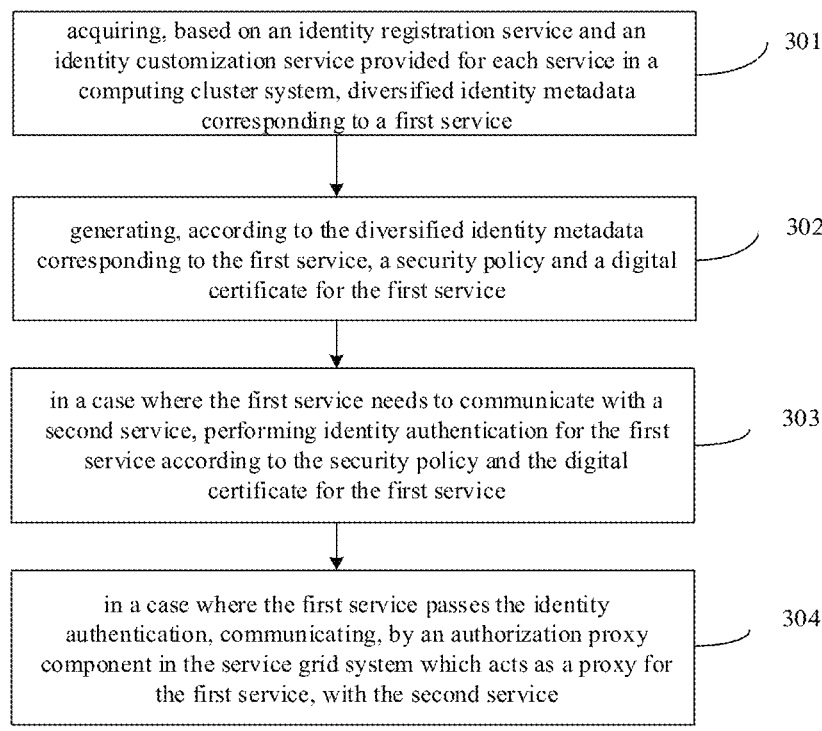

acquiring, based on an identity registration service and an identity customization service provided for each service in a computing cluster system, diversified identity metadata corresponding to a first service    301 generating, according to the diversified identity metadata corresponding to the first service, a security policy and a digital certificate for the first service    302 in a case where the first service needs to communicate with a second service, performing identity authentication for the first service according to the security policy and the digital certificate for the first service    303 in a case where the first service passes the identity authentication, communicating, by an authorization proxy component in the service grid system which acts as a proxy for the first service, with the second service    304

FIG. 3

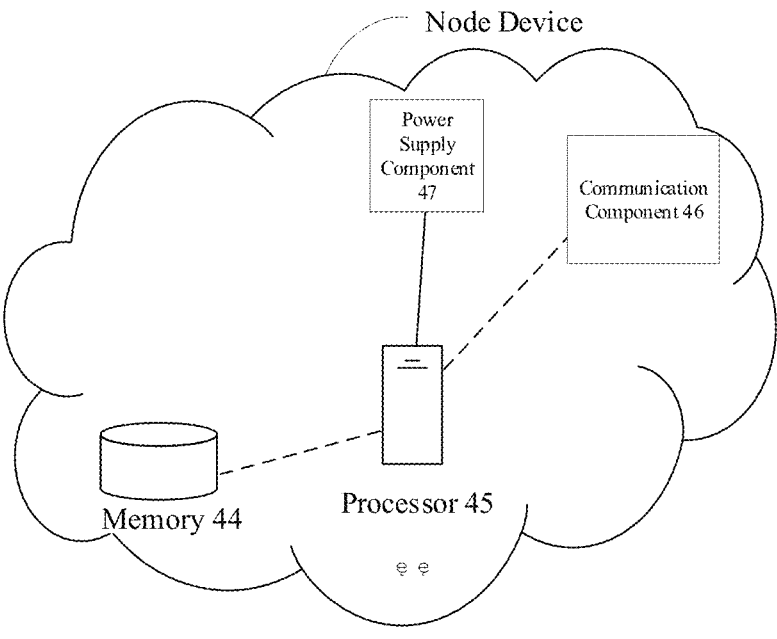

Node Device

Power Supply Component 47

Communication Component 46

Memory 44

Processor 45

FIG. 4

COMPUTING CLUSTER SYSTEM, SECURITY AUTHENTICATION METHOD, NODE DEVICE AND STORAGE MEDIUM

The present application is a U.S. National Phase Application of PCT International Application No. PCT/CN2022/118478 filed Sep. 13, 2022, which claims priority to Chinese patent application No. 202111146547.9, filed on Sep. 28, 2021 and entitled "COMPUTING CLUSTER SYSTEM, SECURITY AUTHENTICATION METHOD, NODE DEVICE AND STORAGE MEDIUM", which is incorporated herein by reference in its entirety.

TECHNICAL FIELD

The present application relates to the field of distributed computing technology, and in particular to a computing cluster system, a security authentication method, a node device and a storage medium.

BACKGROUND

Microservice (or microservice architecture) is a cloud-native architectural method that may break down a single application into a set of small services, with each service running in an independent progress, and the services coordinating and cooperating with each other to externally provide complete application functionality. A lightweight communication mechanism may be employed between the services to perform communication. How to solve the security problem of communication between the services is a technical problem currently faced by computing cluster systems employing a microservice architecture.

SUMMARY

Multiple aspects of the present application provide a computing cluster system, a security authentication method, a node device and a storage medium, so as to solve the security problem of communication between services.

An embodiment of the present application provides a computing cluster system, comprising: at least one computing cluster for carrying services, wherein, in a case where the services comprise at least two services, an identity-based identification authorization mechanism is implemented between the at least two services to perform communication. The system further comprises: a service grid system for implementing the identity-based identification authorization mechanism, the service grid system comprising a management and control component, an identity registration component and an authorization proxy component, wherein the authorization proxy component is distributed in the at least one computing cluster. The identity registration component is used for providing an identity registration service and an identity customization service for each service; acquiring, based on the identity registration service and the identity customization service, diversified identity metadata corresponding to a first service; and reporting the diversified identity metadata to the management and control component. The management and control component is used for generating, according to the diversified identity metadata corresponding to the first service, a security policy and a digital certificate for the first service, and issuing the security policy and the digital certificate for the first service to a corresponding authorization proxy component in a computing cluster where the first service is located. The authorization proxy component is used for, in a case where the first service needs to communicate with a second service, performing identity authentication for the first service according to the security policy and the digital certificate for the first service, and in a case where the identity authentication is passed, communicating, as a proxy for the first service, with the second service; wherein the first service is any one of the at least two services, and the second service is another service different from the first service.

An embodiment of the present application further provides a service grid system for implementing an identity-based identification authorization mechanism, the system comprising a management and control component, an identity registration component and an authorization proxy component, wherein the authorization proxy component is distributed in at least one computing cluster in a computing cluster system. The identity registration component is used for providing an identity registration service and an identity customization service for services in the computing cluster system; acquiring, based on the identity registration service and the identity customization service, diversified identity metadata corresponding to a first service, and reporting the diversified identity metadata to the management and control component. The management and control component is used for generating, according to the diversified identity metadata corresponding to the first service, a security policy and a digital certificate for the first service, and issuing the security policy and the digital certificate for the first service to a corresponding authorization proxy component in a computing cluster where the first service is located. The authorization proxy component is used for, in a case where the first service needs to communicate with a second service, performing identity authentication for the first service according to the security policy and the digital certificate for the first service, and in a case where the identity authentication is passed, communicating, as a proxy for the first service, with the second service; wherein the first service is any one service in the computing cluster system, and the second service is another service different from the first service.

An embodiment of the present application further provides an identity authentication method, which is applied to a service grid system for implementing an identity-based identification authorization mechanism, the above method comprising: acquiring, based on an identity registration service and an identity customization service provided for each service in a computing cluster system, diversified identity metadata corresponding to a first service; generating, according to the diversified identity metadata corresponding to the first service, a security policy and a digital certificate for the first service; in a case where the first service needs to communicate with a second service, performing identity authentication for the first service according to the security policy and the digital certificate for the first service; and in a case where the first service passes the identity authentication, communicating, by an authorization proxy component in the service grid system which acts as a proxy for the first service, with the second service; wherein the first service is any one service in the computing cluster system, and the second service is another service different from the first service.

An embodiment of the present application further provide a node device, comprising: a memory and a processor, wherein the memory is used for storing a computer program, and the processor is coupled with the memory and used for executing the computer program to: acquire, based on an identity registration service and an identity customization service provided for each service in a computing cluster system, diversified identity metadata corresponding to a first service; generate, according to the diversified identity metadata corresponding to the first service, a security policy and a digital certificate for the first service; in a case where the first service needs to communicate with a second service, perform identity authentication for the first service according the security policy and the digital certificate for the first service; and in a case where the first service passes the identity authentication, communicate, by an authorization proxy component in a service grid system which acts as a proxy for the first service, with the second service; wherein the first service is any one service in the computing cluster system, and the second service is another service different from the first service.

An embodiment of the present application further provides a computer-readable storage medium storing a computer program that, when executed by a processor, causes the processor to implement the steps in the identity authentication method described above.

In embodiments of the present application, a service grid system for implementing an identity-based identification authorization mechanism between at least two services is added in a computing cluster system, the service grid system at least comprising a management and control component, an identity registration component, and an authorization proxy component. The identity registration component reports, to the management and control component, acquired diversified identity data corresponding to a first service; according to the diversified identity data, the management and control component generates a security policy and a digital certificate, which correspond to the first service, and issues same to a corresponding authorization proxy component. The authorization proxy component performs identity verification for the corresponding service according to the security policy and the digital certificate, and performs communication for the at least two services by proxy after the identity verification is passed. By means of the cooperation of a management and control component, an identity registration component and an authorization proxy component, an identity-based identification authorization mechanism can be implemented between services without affecting the running of the services, thereby solving the security problem of communication between the services.

BRIEF DESCRIPTION OF THE DRAWINGS

The drawings described herein are used to provide a further understanding of the present application, and constitute a part of the present application. The illustrative embodiments of the present application and descriptions thereof are used to explain the present application, and do not constitute an improper limitation of the present application. In the drawings:

FIG. 3 is a schematic flow chart of an identity authentication method provided in another illustrative embodiment of the present application; and FIG. 4 is a structural schematic diagram of a node device provided in still another illustrative embodiment of the present application.

DETAILED DESCRIPTION

In order to make the purpose, technical solutions and advantages of the present application more explicit, the technical solutions of the present application will be described clearly and completely below with reference to specific embodiments of the present application and the corresponding drawings. Obviously, the described embodiments are only some of the embodiments of the present application, rather than all embodiments. Based on the embodiments of the present application, all other embodiments obtained by those skilled in the art without any creative labor should fall within the scope of the protection of the present application.

With regard to the technical problem in microservice, i.e., how to solve the security problem of communication between services, in some embodiments of the present application, a service grid system for implementing an identity-based identification authorization mechanism between at least two services is added in a computing cluster system, the service grid system at least comprising a management and control component, an identity registration component and an authorization proxy component. The identity registration component reports, to the management and control component, acquired diversified identity data corresponding to a first service; according to the diversified identity data, the management and control component generates a security policy and a digital certificate, which correspond to the first service, and issues the same to a corresponding authorization proxy component; and the authorization proxy component performs identity verification for the corresponding service according to the security policy and the digital certificate, and performs communication for the at least two services by proxy after the identity verification is passed. By means of the cooperation of a management and control component, an identity registration component and an authorization proxy component, an identity-based identification authorization mechanism may be implemented between services without affecting the running of the services, thereby solving the security problem of communication between the services.

The technical solutions provided in various embodiments of the present application will be described below in detail with reference to the drawings.

Figure 1A:
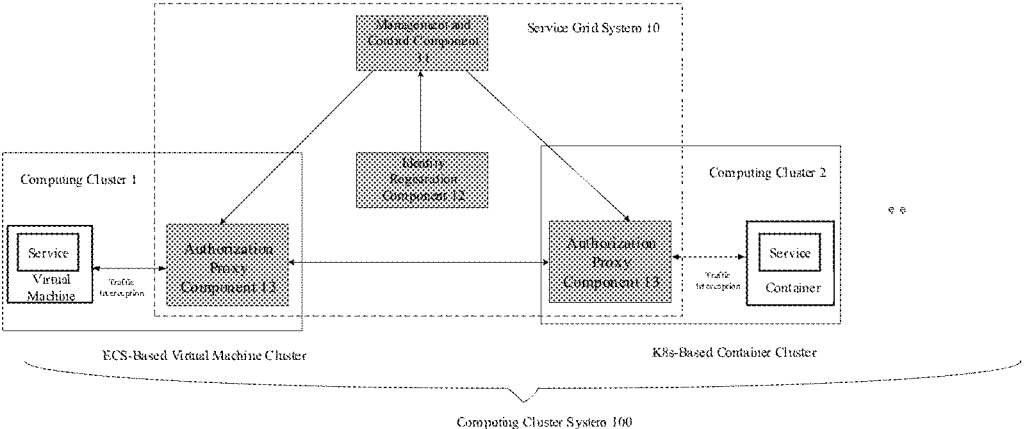
FIG. 1a is a structural schematic diagram of a computing cluster system provided in an illustrative embodiment of the present application.

FIG. 1a is a structural schematic diagram of a computing cluster system provided in an illustrative embodiment of the present application. As shown in FIG. 1a, this computing cluster system 100 comprises at least one computing cluster. The computing clusters is used for carrying services under a microservice architecture, but are not limited to services under the microservice architecture. In the embodiment of the present application, a service is used for implementing part of functions in an application, that is, the service may be implemented as a functional module of the application; or it may also implement all functions of an application, that is, the service may be implemented as an application. Each service carried in the computing cluster may also be called a workload in the computing cluster.

In this embodiment, computing cluster system 100 may comprise one or more computing clusters, each computing cluster comprising various physical devices, such as a server, a computer, a terminal device and a gateway device, and further comprising physical lines between these physical devices for network interconnection. These services or workloads may be carried by these physical devices, that is, various services may be run on these physical devices. It should be noted that the scales, amounts of resources included, and cluster types of different computing clusters may be the same or different. Additionally, different computing clusters may carry services in the same or different ways. For example, some computing clusters may employ a container technology to carry various services, that is, the services are deployed and run in a container environment; while some computing clusters may employ a traditional virtual machine technology to carry various services, that is, the services are deployed and run in a virtual machine environment. Docker technology may be employed, and then container sets (Pods) are deployed on physical devices in a computing cluster to manage services in the computing cluster with Pod as the granularity. One or more services may be deployed in each Pod. Additionally, same services may be deployed in one Pod, or deployed into a plurality of Pods in a distributed manner, specifically depending on application demands. The embodiments of the present application make no limitation of this. As shown in FIG. 1*a*, this computing cluster system 100 is illustrated with an example of comprising a computing cluster 1 and a computing cluster 2. In computing cluster 1, services are deployed and run in a virtual machine environment. This computing cluster 1 may be an ECS-based virtual machine cluster. In computing cluster 2, services deployed and run in a container environment are taken as an example. This computing cluster 2 may be a Kubernetes-based container cluster.

In the embodiments of the present application, different services that belong to one and the same application may need to coordinate and cooperate with each other to externally provide complete application functionality. In order to implement coordination and cooperation, communication is needed between these services. It should be noted that in addition to the communication needed between different services belonging to one and the same application, different services that belong to different applications may also need to communicate with each other due to service sharing or other reasons. In the embodiments of the present application, it is not limited whether two services that need to communicate belong to one and the same application. Additionally, two services that need to communicate may be deployed in one and the same computing cluster or in different computing clusters. In order to implement communication between services, a service grid system is deployed in computing cluster system 100. This service grid system, in one aspect, may serve as an infrastructure layer for communication between services, and is used for performing communication between the services by proxy, such that data transmission between the services may be completed without a need to pay attention to deployment address information of each other.

Additionally, in order to ensure the security of communication between services, in an embodiment of the present application, the service grid system may further implement an identity-based identification authorization mechanism between the services. Optionally, the identity-based identification authorization mechanism implemented by the service grid system in this embodiment may be a zero-trust security mechanism, namely a security concept that no services should be automatically trusted regardless of whether they are in one and the same network or security domain. That is to say, communication between any two services requires identity-based identification authorization for each other, and data communication can be performed only after the identity-based identification authorization is passed.

In an embodiment of the present application, the service grid system, as the infrastructure layer for processing communication between services, is responsible for constructing complex service topologies of modern cloud-native applications, to reliably deliver requests. Additionally, by providing an identity-based identification authorization mechanism, this can reduce an attacked area in a cloud-native environment and provide a basic framework required by a zero-trust application network. By managing service-to-service security through the service grid system provided in this embodiment, end-to-end encryption, service-level identity identification, and fine-grained authorization policies of the service grid may be ensured.

In this embodiment, the service grid system consists of a control plane and a data plane. The control plane is used for providing a policy and/or configuration for the data plane. Specifically, the control plane is a set of services running in one dedicated namespace. These services complete some control and management functions, including aggregating telemetry data, providing user-facing APIs, providing control data to data plane proxy, or the like, and they together drive the behavior of the data plane. In other words, the control plane is used for controlling proxy behaviors across the entire service grid system. Service routing rules and identity validation policies may be specified overall on the control plane, or metrics may be collected and parameters for the data plane may be configured. Generally, communication between the data plane and the control plane is standardized through API definitions. The data plane is composed of a series of transparent proxies running next to each service instance. The data plane causes each service not to call a service directly through networks, but to call its local proxy component to communicate with a proxy component in another service. The proxy component in turn encapsulates a complex logic of service-to-service exchange. A set of interconnected proxy components in a service grid constitute the entire data plane. Based on the service grid system provided in the embodiments of the present application, the at least one computing cluster may support the following functions.

1. Among services, bidirectional identity-based identification authorization or a service-side identity-based identification authorization is implemented, and lifecycle management is supported, such as automatic rotation supporting digital certificates, and all communications between the services are subjected to identity validation and encryption processing. The identity-based identification authorization mechanism in the embodiments of the present application may be a Transport Layer Security (TLS) identification mechanism, but the present application is not limited to this.

2. Finer-grained authorization based on identity and authorization based on other dimension parameters are enabled. The foundation of Role-Based Access Control (RBAC) supports a "least privilege" stance, that is, only authorized services can communicate with each other according to ALLOW/DENY rules. An implementation structure of the service grid system provided in the embodiments of the present application will be described below in detail.

As shown in FIG. 1*a*, service grid system 10 provided in this embodiment comprises: a management and control component 11, an identity registration component 12 and an authorization proxy component 13. Management and control component 11 is a component in a control plane, while identity registration component 12 and authorization proxy component 13 are components in a data plane. In this embodiment, management and control component 11 may be deployed independently, for example, in a cloud, or may also be deployed in a certain computing cluster. Identity registration component 12 may also be deployed independently, or deployed in a certain computing cluster. Authorization proxy component 13 may be deployed in each computing cluster.

Identity registration component 12 is used for providing an identity registration service and an identity customization service for each service carried by computing cluster system 100, diversified identity metadata corresponding to each service may be acquired based on the identity registration service and the identity customization service, and the same is reported to management and control component 11. In this embodiment of the present application, the grid service system processes various services in a same or similar manner. For convenience of description, a first service is taken as an example. The first service is any one of various services carried in computing cluster system 100. For the first service, the identity registration component may acquire diversified identity metadata corresponding to the first service based on an identity registration service and an identity customization service, which are provided externally, and report the diversified identity metadata to the management and control component.

Management and control component 11 is used for receiving the diversified identity information corresponding to the first service provided by the identity registration component; generating, according to the diversified identity metadata corresponding to the first service, a security policy and a digital certificate for the first service; and issuing the security policy and the digital certificate for the first service to a corresponding authorization proxy component in a computing cluster where the first service is located.

Authorization proxy component 13 is used for receiving the security policy and the digital certificate for the first service issued by management and control component 11 and storing locally; in a case where the first service needs to communicate with a second service, performing identity authentication for the first service according to the security policy and the digital certificate for the first service; and in a case where the identity authentication is passed, communicating, as a proxy for the first service, with the second service; wherein the first service is any one of at least two services carried in the computing cluster system, and the second service is another service different from the first service.

Further, identity registration component 12 may also be called an identity registrar, which may automatically monitor services in the computing cluster system. It may not only support application services running in a Pod containerization form and running in a Kubernetes cluster, but also support application services running on a virtual machine or a physical machine. Moreover, it is not limited whether these services are loaded with service accounts. Application services both in the Pod containerization form and running on a virtual machine or a physical machine may serve as service examples in the embodiments of the present application, but the present application is not limited to this. Additionally, the identity registration component further provides an identity registration service for these services, which allows these services to initiate registration with the identity registration component. Additionally, the identity registration component further provides an identity customization service for these services, which allows a user to customize identity metadata for these services so as to achieve diversity in the identity metadata. Based on this, when the identity registration component acquires diversified identity metadata corresponding to the first service based on the identity registration service and the identity customization service, this may be implemented through the following steps:

receiving an identity registration request initiated for the first service; acquiring, from the identity registration request, a first identity metadata corresponding to the first service; and acquiring, from a specified metadata storage object, a second identity metadata customized by a user for the first service; wherein the first identity metadata and the second identity metadata form the diversified identity metadata corresponding to the first service.

In this embodiment, there are many forms of initiating the identity registration request. For example, it may be automatically sent by the first service to the identity registration component when a set trigger event is detected; or it may also be initiated by the user through a service management page according to a registration demand, and the embodiments make no limitation of this. The first identity metadata may comprise at least one of identifier information of a computing cluster where the first service is located, a user account or a service account associated with the first service, and identifier information of a physical node where the first service is located. The second identity metadata comprises a running environment identifier of the first service. For example, if the first service is in a Pod that relies on a container environment, the second identity metadata may comprise an identifier of a container image on which the first service relies (referred to as container image tag-based identity metadata). Further, the second identity metadata may further comprise information on a geographical location to which the first service is deployed (referred to as geographical location-based identity metadata), a physical node where the first service is located (referred to as node-based identity metadata), and identity metadata based on other hardware attribute information. The embodiments make no limitation of this.

In some optional embodiments of the present application, management and control component 11 may provide a declarative API for a user. The essence of the declarative API is that after the user submits a description of one API object to the management and control component, the management and control component will be responsible for ensuring that the states of respective resources in the entire cluster are consistent with requirements described by this API object. Correspondingly, when generating a security policy for the first service according to the diversified identity metadata corresponding to the first service, management and control component 11 is specifically used for: receiving security policy requirement description information submitted by the user through the declarative API; and generating the security policy for the first service according to the security policy requirement description information and the diversified identity metadata.

Figure 1B:
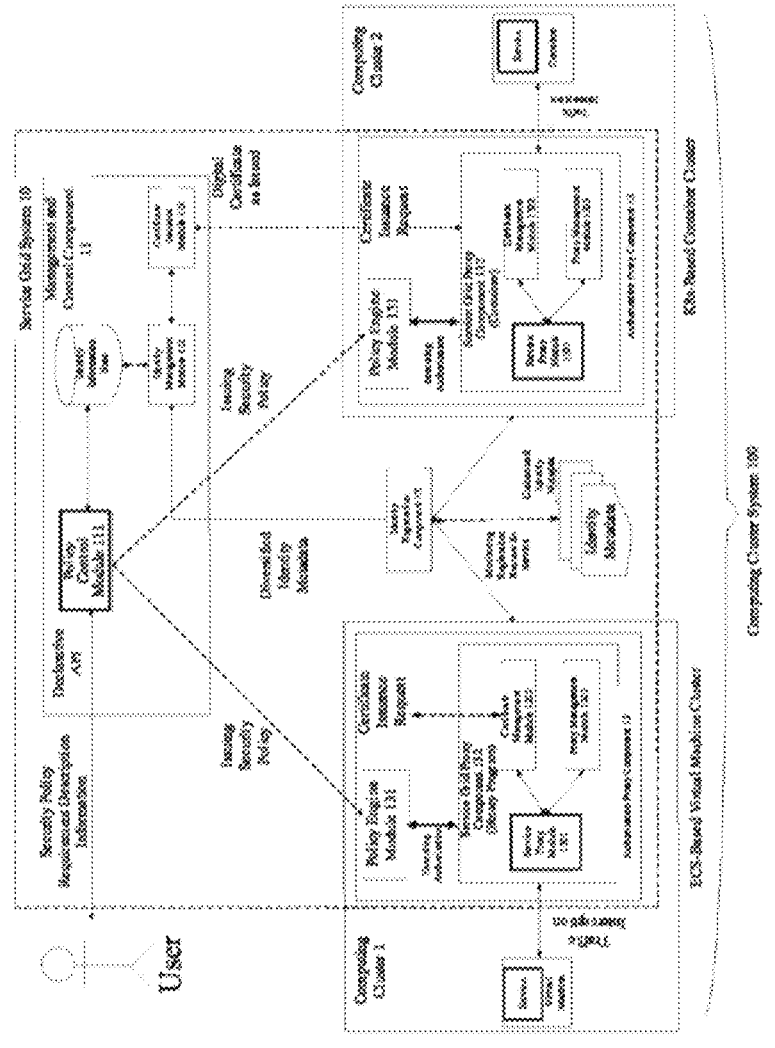
FIG. 1b is a structural schematic diagram of a computing cluster system provided in another illustrative embodiment of the present application.

In the embodiments of the present application, there is no limitation on an internal implementation structure of the management and control component. In an optional embodiment, as shown in FIG. 1*b*, an internal implementation structure of management and control component 11 comprises a policy control module 111, an identity management module 112 and a certificate issuance module 113. The declarative API is provided externally by policy control module 111. Identity management module 112 is used for receiving the diversified identity metadata of the first service reported by the identity registration component, performing standardization processing for the diversified identity metadata of the first service, and storing the diversified identity metadata to an identity information base. Policy control module 111 is used for receiving the security policy requirement description information submitted by the user through the declarative API, generating the security policy for the first service according to the security policy requirement description information and the diversified identity metadata of the first service, and issuing the security policy for the first service to the corresponding authorization proxy component in the computing cluster where the first service is located. The certificate issuance module 113 is used for acquiring the diversified identity metadata of the first service from the identity information base through the identity management module in a case where a certificate issuance request sent by the authorization proxy component corresponding to the first service has been received, generating a digital certificate for the first service according to the diversified identity metadata of the first service, and issuing the digital certificate for the first service to the authorization proxy component corresponding to the first service.

Further, when generating the security policy for the first service according to the security policy requirement description information and the diversified identity metadata of the first service, policy control module 111 is specifically used for: selecting first target identity metadata from the diversified identity metadata of the first service; and generating the security policy for the first service according to the security policy requirement description information and the first target identity metadata; wherein the first target identity metadata is partial identity metadata of the diversified identity metadata, or may also be whole identity metadata.

Correspondingly, when generating a digital certificate for the first service according to the diversified identity metadata of the first service, certificate issuance module 113 is specifically used for: selecting second target identity metadata from the diversified identity metadata of the first service; and generating the digital certificate for the first service according to the second target identity metadata; wherein the first target identity metadata is at least partially the same as the second target identity metadata. Similarly, the second target identity metadata is partial identity metadata of the diversified identity metadata, or may also be whole identity metadata.

In this embodiment, there is no limitation on an internal implementation structure of authorization proxy component 13. As shown in FIG. 1b, it is an internal implementation structure of authorization proxy component 13 provided in the embodiments of the present application, comprising: a policy engine module 131 and a service grid proxy component 132. Each policy engine module 131 is used for receiving a security policy for a service in a computing cluster where it is located and performing identity authentication. Taking a policy engine module in a computing cluster where the first service is located as an example, policy engine module 131 is used for receiving the security policy for the first service issued by the policy control module in the management and control component, in a case where the policy engine module is located in the computing cluster where the first service is located. Correspondingly, each service grid proxy component 132, in a first aspect, is used for sending, on behalf of a service for which it acts as a proxy, a certificate issuance request to the certificate issuance module in the management and control component, and receiving a digital certificate returned by the certificate issuance module; and, in another aspect, for initiating an identity authentication request to the policy engine module in a case where the service for which it acts as a proxy needs to communicate with other services, and communicating with other services as a proxy for the service, in a case where the identity authentication is passed. Still taking the service grid proxy component in a computing cluster where the first service is located as an example, this service grid proxy component is used for sending a certificate issuance request to the certificate issuance module in the management and control component in a case where the service grid proxy component is located in the computing cluster where the first service is located and is corresponding to the first service (wherein the "corresponding to the first service" refers to that the service grid proxy component is a transparent proxy of the first service and is responsible for identity authentication and communication as a proxy for the first service), and receiving the digital certificate for the first service returned by the certificate issuance module; sending an identity authentication request to the policy engine module in a case where the first service needs to communicate with the second service, wherein the identity authentication request comprises the digital certificate for the first service; and communicating, as a proxy for the first service, with the second service, on condition that an authorization message sent by the policy engine module has been received. The policy engine module is further used for; performing identity authentication for the first service according to the digital certificate for the first service included in the identity authentication request sent by the service grid proxy component and the security policy for the first service stored locally, and returning the authorization message to the service grid proxy component on condition that the identity authentication has been passed, indicating that the communication between the first service and the second service is secure, and that the service grid proxy component may communicate with the second service as a proxy for the first service.

There may be a plurality of security policies for the first service. When performing identity authentication for the first service, the digital certificate for the first service may be matched with the plurality of security policies one by one. Each security policy comprises identity information of the first service, and if identity information of the first service included in the digital certificate for the first service is matched, indicating that the first service passes the identity authentication.

Further, the embodiments of the present application do not limit an internal implementation structure of service grid proxy component 132. As shown in FIG. 1b, an internal implementation structure of service grid proxy component 132 comprises: a service proxy module 1321 and a certificate management module 1322. Further optionally, service grid proxy component 132 further comprises a proxy management module 1323 used for managing a lifecycle of service proxy module 1321 and responsible for operations such as starting and stopping a service grid proxy binary program or a service grid proxy container. The certificate management module is used for sending a certificate issuance request to the certificate issuance module in the management and control component in a case where the service grid proxy component to which it belongs is located in a computing cluster where the first service is located, and corresponds to the first service; receiving the digital certificate for the first service returned by the certificate issuance module, and storing the digital certificate for the first service. The service proxy module is used for monitoring a communication requirement of the first service, acquiring the digital certificate for the first service from the certificate management module in a case where the first service needs to communicate with a second service; sending an authorization request to the policy engine module, and communicating, as a proxy for the first service, with the second service, on condition that an authorization message sent by the policy engine module has been received.

In this embodiment, there may be a plurality of computing clusters. The first service and the second service may be deployed in different computing clusters. Moreover, the first service may be deployed in a virtual machine, and the second service may be deployed in a container.

In order to facilitate understanding, the technical solution of the embodiment will be described below in detail by taking a first service deployed in a virtual machine while a second service deployed in a container as an example. It should be noted here that in a case where the first service is deployed in a virtual machine environment, a service grid proxy component corresponding to the first service may be specifically implemented as a service grid proxy binary program. In a case where the second service is deployed in a container environment, a service grid proxy component corresponding to the second service may be specifically implemented as a service grid proxy container. In the following embodiments, both the first service and the second service are collectively referred to as a workload.

1. Through a workload-faced identity registration component, a computing cluster system may automatically monitor workloads in an environment, which may not only support workloads in a Pod containerization form running in a Kubernetes cluster, but also support workloads running on a virtual machine or a physical machine, regardless of whether these workloads are loaded with service accounts.

2. The identity registration component may read identity metadata in this system, send an identity registration request of a monitored workload to an identity management module, and allow a user to customize the identity metadata of the workload through the identity registration component. The identity metadata customized for the workload by the user may also be sent to the identity management module. The user-customized identity metadata may support any form of metadata, including several types as follows:

identity metadata based on container image tag, i.e., a container image tag on which the workload relies is used as identity metadata of the workload to identify the workload;

identity metadata based on geographical location, that is, a geographical location where the workload is deployed is used as identity metadata of the workload to identify the workload; this geographical location may correspond to a plurality of workloads, but one workload can only correspond to one geographical location;

identity metadata based on host information, that is, information of a host where the workload is located, such as name, IP address, and the like, is used as identity metadata of the workload to identify the workload; and identity metadata based on other software and hardware attributes.

3. The identity management module standardizes and converts identity metadata registered by each workload into identity information, and stores same into an identity information base, and this identity information may support, but is not limited to, the Secure Production Identity Framework for Everyone (SPIFFE) standard.

4. A policy control module provides a cloud-native declarative API mode for a user to define a security policy. Specifically, through this API, security policy requirement description information submitted by the user is acquired, security policies for the workloads are generated according to this security policy requirement description information and diversified identity information in the identity information base, and these security policies are issued to a policy engine module.

5. A certificate issuance module in a management and control component may acquire identity information of each workload by calling the identity management module, and may generate, based on this identity information, a security certificate for the workload and issue same to a certificate management module on condition that a certificate issuance request sent by the certificate management module in the service grid proxy component has been received.

6. The certificate management module in the service grid proxy container or service grid proxy binary program sends a certificate issuance request to the certificate issuance module in the management and control component, requests the certificate issuance module to issue a digital certificate to a corresponding workload, and receives the digital certificate issued by the certificate issuance module.

7. When two workloads located in a virtual machine and a container need to communicate, the service grid proxy binary program and the service grid proxy container access the policy engine module, and the policy engine module executes identity-based identification authorization for the two workloads based on the security policies as issued. When the policy engine module is accessed, a digital certificate for the workload will be provided to the policy engine module, the digital certificate comprising the identity information of the workload.

8. The service grid proxy component of the service grid system in this embodiment further comprises a proxy management module, used for managing a lifecycle of the service grid proxy binary program or the service grid proxy container, and responsible for operations such as starting and stopping the service grid proxy binary program or the service grid proxy container.

The service grid system provided in the embodiments of the present application may implement, in terms of proxy services, secure communication based on zero trust, provide a declarative API mode allowing for definition of security policies, and deploy and install the service grid proxy component into a data plane through a centralized control plane, and provide corresponding lifecycle management. Further, the declarative authorization service, as a policy control plane, may issue a security policy for a specified proxy component without affecting service applications. Further, the identity-based identification authorization mechanism supports monitoring existing workloads through the identity registration component and registering the workloads based on identity metadata.

Figure 2:
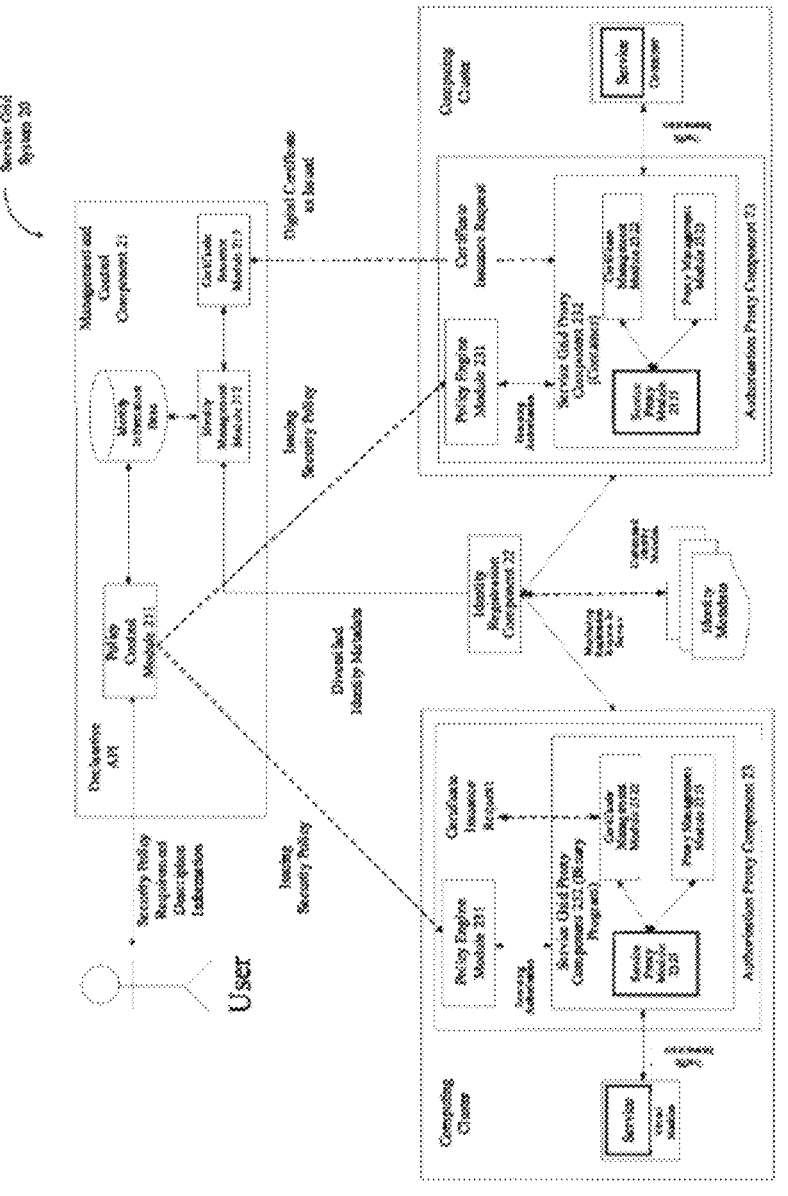
FIG. 2 is a structural schematic diagram of a service grid system for implementing an identity-based identification authorization mechanism provided in another illustrative embodiment of the present application.

FIG. 2 is a structural schematic diagram of a service grid system provided by another illustrative embodiment of the present application. This system is used for implementing an identity-based identification authorization mechanism. As shown in FIG. 2, this service grid system 20 comprises: a management and control component 21, an identity registration component 22 and an authorization proxy component 23. The service grid system of this embodiment may be applied to any computing system. As shown in FIG. 2, it may be applied to a computing cluster system, and the authorization proxy component is distributed in at least one computing cluster in the computing cluster system. However, the present application is not limited to this.

Identity registration component 22 is used for providing an identity registration service and an identity customization service for services in the computing cluster system, acquiring diversified identity metadata corresponding to a first service based on the identity registration service and the identity customization service, and reporting the diversified identity metadata to the management and control component. Management and control component 21 is used for generating, according to the diversified identity metadata corresponding to the first service, a security policy and a digital certificate for the first service, and issuing the security policy and the digital certificate for the first service to a corresponding authorization proxy component in a computing cluster where the first service is located. Authorization proxy component 23 is used for, in a case where the first service needs to communicate with a second service, performing identity authentication for the first service according to the security policy and the digital certificate for the first service, and in a case where the identity authentication is passed, communicating, as a proxy for the first service, with the second service; wherein the first service is any one service in the computing cluster system, and the second service is another service different from the first service.

In an optional embodiment, as shown in FIG. 2, an internal implementation structure of management and control component 21 comprises: a policy control module 211, an identity management module 212 and a certificate issuance module 213. Correspondingly, as shown in FIG. 2, an internal implementation structure of authorization proxy component 23 comprises: a policy engine module 231 and a service grid proxy component 232. As shown in FIG. 2, an internal implementation structure of service grid proxy component 232 comprises: a service proxy module 2321 and a certificate management module 2322.

Regarding the detailed implementations and internal implementation structures of the above components, please refer to the foregoing embodiments, which will not be repeated here.

FIG. 3 is a schematic flow chart of an identity authentication method (or called a security authentication method) provided in another illustrative embodiment of the present application. The method is applied to a service grid system for implementing an identity-based identification authorization mechanism, the method comprises, as shown in FIG. 3:

301. acquiring, based on an identity registration service and an identity customization service provided for each service in a computing cluster system, diversified identity metadata corresponding to a first service;

302. generating, according to the diversified identity metadata corresponding to the first service, a security policy and a digital certificate for the first service;

303. in a case where the first service needs to communicate with a second service, performing identity authentication for the first service according to the security policy and the digital certificate for the first service; and 304. in a case where the first service passes the identity authentication, communicating, by an authorization proxy component in the service grid system which acts as a proxy for the first service, with the second service; wherein the first service is any one service in the computing cluster system, and the second service is another service different from the first service.

Further, acquiring, based on the identity registration service and the identity customization service provided for each service in the computing cluster system, the diversified identity metadata corresponding to the first service may be implemented through the following steps:

receiving an identity registration request initiated for the first service, acquiring, from the identity registration request, a first identity metadata corresponding to the first service, and acquiring, from a specified metadata storage object, a second identity metadata customized by a user for the first service: wherein the first identity metadata and the second identity metadata form the diversified identity metadata corresponding to the first service.

Further, the method further comprises providing a declarative API for a user; and then generating the security policy for the first service according to the diversified identity metadata corresponding to the first service may be implemented through the following process:

receiving security policy requirement description information submitted by the user through the declarative API; and generating the security policy for the first service according to the security policy requirement description information and the diversified identity metadata.

Further optionally, the above generating the security policy for the first service according to the security policy requirement description information and the diversified identity metadata comprises: selecting a first target identity metadata from the diversified identity metadata; and generating the security policy for the first service according to the security policy requirement description information and the first target identity metadata.

Correspondingly, generating the digital certificate for the first service according to the diversified identity metadata corresponding to the first service comprises: selecting a second target identity metadata from the diversified identity metadata, and generating the digital certificate for the first service according to the second target identity metadata; wherein the first target identity metadata is at least partially the same as the second target identity metadata.

The above method in this embodiment may be applied to the service grid system shown in FIG. 1a or FIG. 2. In combination with the implementation structure of the service grid system shown in FIG. 1a or FIG. 2, the detailed implementation process of each step may be referred to the foregoing embodiments, which will not be repeated here.

FIG. 4 is a structural schematic diagram of a node device provided in still another illustrative embodiment of the present application. As shown in FIG. 4, this device comprises: a memory 44 for storing a computer program, and a processor 45 coupled with memory 44 and used for executing the computer program to:

acquire, based on an identity registration service and an identity customization service provided for each service in a computing cluster system, diversified identity metadata corresponding to a first service:

generate, according to the diversified identity metadata corresponding to the first service, a security policy and a digital certificate for the first service:

in a case where the first service needs to communicate with a second service, perform identity authentication for the first service according the security policy and the digital certificate for the first service; and in a case where the first service passes the identity authentication, communicate, by an authorization proxy component in a service grid system which acts as a proxy for the first service, with the second service; wherein the first service is any one service in the computing cluster system, and the second service is another service different from the first service.

Further, in a case of acquiring, based on the identity registration service and the identity customization service provided for each service in the computing cluster system, the diversified identity metadata corresponding to the first service, processor 45 is specifically used for:

receiving an identity registration request initiated for the first service, acquiring, from the identity registration request, a first identity metadata corresponding to the first service, and acquiring, from a specified metadata storage object, a second identity metadata customized by a user for the first service; wherein the first identity metadata and the second identity metadata form the diversified identity metadata corresponding to the first service.

Further, this node device may further provide a declarative API for a user; and then when generating the security policy for the first service according to the diversified identity metadata corresponding to the first service, processor 45 is specifically used for:

receiving security policy requirement description information submitted by the user through the declarative API; and generating the security policy for the first service according to the security policy requirement description information and the diversified identity metadata.

Further optionally, when generating the security policy for the first service according to the security policy requirement description information and the diversified identity metadata, processor 45 is specifically used for: selecting a first target identity metadata from the diversified identity metadata; and generating the security policy for the first service according to the security policy requirement description information and the first target identity metadata.

Correspondingly, when generating the digital certificate for the first service according to the diversified identity metadata corresponding to the first service, processor 45 is specifically used for: selecting a second target identity metadata from the diversified identity metadata, and generating the digital certificate for the first service according to the second target identity metadata; wherein the first target identity metadata is at least partially the same as the second target identity metadata.

Further, as shown in FIG. 4, the node device in this embodiment may further comprise a power supply component 47 and a communication component 46. Only some components are schematically shown in FIG. 4, which does not mean that the node device merely comprises those components shown in FIG. 4. Additionally, each component in the node device shown in FIG. 4 may be deployed in a distributed manner or in a centralized manner, and the present application makes no limitation of this.

The node device in this embodiment may be implemented as the foregoing service grid system. Regarding its detailed internal implementation structure, reference may be made to the foregoing service grid system embodiment, which will not be repeated here.

Correspondingly, an embodiment of the present application further provides a computer-readable storage medium storing a computer program, which, when executed, can implement the steps executed in the method embodiments described above.

Correspondingly, an embodiment of the present application further provides a computer program product comprising a computer program/instruction that, when executed by a processor, causes the processor to be capable of implementing the steps executed in the method embodiments described above.

Those skilled in the art will appreciate that the embodiments of the present invention may be provided as methods, systems, or computer program products. Thus, the present invention may be in the form of completely hardware embodiments, completely software embodiments, or embodiments combining software and hardware aspects. Moreover, the present invention may be in the form of a computer program product implemented on one or more computer-usable storage media (including, but not limited to, disk storage, CD-ROM, optical storage, etc.) including computer-usable program codes therein.

The present invention is described with reference to flow charts and/or block diagrams of methods, devices (systems), and computer program products according to the embodiments of the present invention. It should be understood that each process and/or block in the flow charts and/or block diagrams, and combinations of processes and/or blocks in the flow charts and/or block diagrams, may be implemented by computer program instructions. These computer program instructions may be provided to a processor of a general-purpose computer, a special purpose computer, an embedded processing machine, or other programmable data processing device to produce one machine, such that the instructions executed by the processor of the computer or other programmable data processing device produce an apparatus for implementing functions specified in one or more processes in a flow chart and/or one or more blocks in a block diagram.

These computer program instructions may also be stored in a computer-readable memory that may direct a computer or other programmable data processing device to work in a particular manner, such that the instructions stored in this computer-readable memory produce an article of manufacture comprising an instruction apparatus, and this instruction apparatus implements functions specified in one or more processes in a flow chart and/or in one or more blocks in a block diagram.

These computer program instructions may also be loaded onto a computer or other programmable data processing device, such that a series of operating steps are performed on the computer or other programmable device to produce computer-implemented processing, thereby making the instructions executed on the computer or other programmable device provide steps for implementing functions specified in one or more processes in a flow chart and/or one or more blocks in a block diagram.

In one typical configuration, a computing device comprises one or more processors (CPUs), input/output interfaces, network interfaces, and a memory.

The memory may include a non-permanent storage such as a random access memory (RAM), and/or non-volatile memory forms such as a read-only memory (ROM) or a flash RAM, in computer-readable media. The memory is an example of the computer-readable media.

Computer-readable media include both permanent and non-permanent, removable and non-removable media that may implement information storage by any method or technology. The information may be computer-readable instructions, data structures, modules of programs, or other data. Examples of computer storage media include, but are not limited to, a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a tape magnetic disk storage or other magnetic storage devices, or any other non-transmission media, which may be used to store information that may be accessed by a computing device. As defined herein, the computer-readable media do not include transitory media, such as modulated data signals and carrier waves.

It should also be noted that terms "comprise", "include" or any other variants thereof are intended to cover a non-exclusive inclusion, such that a process, method, article, or device comprising a series of elements not only comprises these elements, but also comprises other elements not expressly listed, or elements inherent to such process, method, article or device. Without further limitation, an element defined by the statement "comprising a . . . " does not exclude the presence of additional identical elements in a process, method, article or device that comprises this element.

The above embodiments are merely preferable embodiments of the present application and are not used to limit the present application. For those skilled in the art, various modifications and variations may be made to the present application. Any modifications, equivalent replacements, improvements, or the like made within the spirit and principles of the present application should be included in the scope of the claims of the present application.

What is claimed is:

1. A computing cluster system, comprising at least one computing cluster for carrying services, wherein, in a case where the services comprise at least two services, an identity-based identification authorization mechanism is implemented between the at least two services to perform communication;

the system further comprises: a service grid system for implementing the identity-based identification authorization mechanism, the service grid system comprises a management and control component, an identity registration component and an authorization proxy component, wherein the authorization proxy component is distributed in the at least one computing cluster;

the identity registration component is used for: providing an identity registration service and an identity customization service for each service; acquiring, based on the identity registration service and the identity customization service, diversified identity metadata corresponding to a first service; and reporting the diversified identity metadata to the management and control component;

the management and control component is used for: generating, according to the diversified identity metadata corresponding to the first service, a security policy and a digital certificate for the first service; and issuing the security policy and the digital certificate for the first service to a corresponding authorization proxy component in a computing cluster where the first service is located; and the authorization proxy component is used for, in a case where the first service needs to communicate with a second service, performing identity authentication for the first service according to the security policy and the digital certificate for the first service, and in a case where the identity authentication is passed, communicating, as a proxy for the first service, with the second service;

wherein the first service is any one of the at least two services, and the second service is another service different from the first service.

2. The system according to claim 1, wherein in a case of acquiring, based on the identity registration service and the identity customization service, the diversified identity metadata corresponding to the first service, the identity registration component is specifically used for:

receiving an identity registration request initiated for the first service; acquiring, from the identity registration request, a first identity metadata corresponding to the first service; and acquiring, from a specified metadata storage object, a second identity metadata customized by a user for the first service; wherein the first identity metadata and the second identity metadata form the diversified identity metadata corresponding to the first service.

3. The system according to claim 1, wherein the management and control component provides a declarative API for a user, and in a case of generating, according to the diversified identity metadata corresponding to the first service, the security policy for the first service, the management and control component is specifically used for:

receiving security policy requirement description information submitted by the user through the declarative API; and generating the security policy for the first service according to the security policy requirement description information and the diversified identity metadata.

4. The system according to claim 3, wherein the management and control component comprises: a policy control module, an identity management module and a certificate issuance module; and the declarative API is provided by the policy control module;

the identity management module is used for receiving the diversified identity metadata reported by the identity registration component, performing standardization processing for the diversified identity metadata, and storing the diversified identity metadata after standardization processing to an identity information base;

the policy control module is used for receiving the security policy requirement description information submitted by the user through the declarative API; generating the security policy for the first service according to the security policy requirement description information and the diversified identity metadata; and issuing the security policy for the first service to the corresponding authorization proxy component in the computing cluster where the first service is located; and the certificate issuance module is used for, in a case where a certificate issuance request sent by the authorization proxy component corresponding to the first service has been received, acquiring the diversified identity metadata from the identity information base through the identity management module; generating the digital certificate for the first service according to the diversified identity metadata; and issuing the digital certificate for the first service to the authorization proxy component corresponding to the first service.

5. The system according to claim 4, wherein, in a case of generating the security policy for the first service according to the security policy requirement description information and the diversified identity metadata, the policy control module is specifically used for:

selecting a first target identity metadata from the diversified identity metadata; and generating the security policy for the first service according to the security policy requirement description information and the first target identity metadata; and correspondingly, in a case of generating the digital certificate for the first service according to the diversified identity metadata, the certificate issuance module is specifically used for: selecting a second target identity metadata from the diversified identity metadata; and generating the digital certificate for the first service according to the second target identity metadata;

wherein the first target identity metadata is at least partially same as the second target identity metadata.

6. The system according to claim 1, wherein each authorization proxy component comprises: a policy engine module and a service grid proxy component;

the policy engine module is used for, in a case where the policy engine module is located in the computing cluster where the first service is located, receiving the security policy for the first service issued by the management and control component;

the service grid proxy component is used for, in a case where the service grid proxy component is located in the computing cluster where the first service is located and is corresponding to the first service, sending a certificate issuance request to the management and control component, and receiving the digital certificate for the first service returned by the management and control component; and in a case where the first service needs to communicate with the second service, sending an identity authentication request to the policy engine module, wherein the identity authentication request comprises the digital certificate for the first service; and on condition that an authorization message sent by the policy engine module has been received, communicating, as the proxy for the first service, with the second service; and the policy engine module is further used for performing, according to the digital certificate for the first service comprised in the identity authentication request and the security policy for the first service, identity authentication for the first service, and returning the authorization message to the service grid proxy component on condition that verification has been passed.

7. The system according to claim 6, wherein the service grid proxy component comprises: a service proxy module and a certificate management module;

the certificate management module is used for, in a case where a service grid proxy component to which the certificate management module belongs is located in the computing cluster where the first service is located, and is corresponding to the first service, sending the certificate issuance request to the management and control component, and receiving the digital certificate for the first service returned by the management and control component; and the service proxy module is used for, in a case where the first service needs to communicate with the second service, acquiring the digital certificate for the first service from the certificate management module; sending an authorization request to the policy engine module; and on condition that the authorization message sent by the policy engine module has been received, communicating, as the proxy for the first service, with the second service.

8. The system according to claim 1, wherein the computing cluster is provided as a plurality of computing clusters, the first service and the second service are deployed in different computing clusters, and the first service is deployed in a virtual machine, the second service is deployed in a container.

9. An identity authentication method, applied to a service grid system for implementing an identity-based identification authorization mechanism, wherein the method comprises:

acquiring, based on an identity registration service and an identity customization service provided for each service in a computing cluster system, diversified identity metadata corresponding to a first service;

generating, according to the diversified identity metadata corresponding to the first service, a security policy and a digital certificate for the first service;

in a case where the first service needs to communicate with a second service, performing identity authentication for the first service according to the security policy and the digital certificate for the first service; and in a case where the first service passes the identity authentication, communicating, by an authorization proxy component in the service grid system which acts as a proxy for the first service, with the second service; wherein the first service is any one service in the computing cluster system, and the second service is another service different from the first service.

10. The method according to claim 9, wherein acquiring, based on the identity registration service and the identity customization service provided for each service in the computing cluster system, the diversified identity metadata corresponding to the first service comprises:

receiving an identity registration request initiated for the first service, acquiring, from the identity registration request, a first identity metadata corresponding to the first service; and acquiring, from a specified metadata storage object, a second identity metadata customized by a user for the first service; wherein the first identity metadata and the second identity metadata form the diversified identity metadata corresponding to the first service.

11. The method according to claim 9, wherein the method further comprises providing a declarative API for a user; and the generating the security policy for the first service according to the diversified identity metadata corresponding to the first service comprises:

receiving security policy requirement description information submitted by the user through the declarative API; and generating the security policy for the first service according to the security policy requirement description information and the diversified identity metadata.

12. The method according to claim 11, further comprising:

receiving the diversified identity metadata, performing standardization processing for the diversified identity metadata, and storing the diversified identity metadata after standardization processing to an identity information base;

receiving the security policy requirement description information submitted by the user through the declarative API; generating the security policy for the first service according to the security policy requirement description information and the diversified identity metadata; and in a case where a certificate issuance request has been received, acquiring the diversified identity metadata from the identity information base; generating the digital certificate for the first service according to the diversified identity metadata.

13. The method according to claim 12, wherein the generating the security policy for the first service according to the security policy requirement description information and the diversified identity metadata further comprises:

selecting a first target identity metadata from the diversified identity metadata; and generating the security policy for the first service according to the security policy requirement description information and the first target identity metadata; and wherein the generating the digital certificate for the first service according to the diversified identity metadata further comprises: selecting a second target identity metadata from the diversified identity metadata; and generating the digital certificate for the first service according to the second target identity metadata;

wherein the first target identity metadata is at least partially same as the second target identity metadata.

14. The method according to claim 9, further comprising: receiving the security policy for the first service;

sending a certificate issuance request, and receiving the digital certificate for the first service; and in a case where the first service needs to communicate with the second service, sending an identity authentication request, wherein the identity authentication request comprises the digital certificate for the first service; and on condition that an authorization message has been received, communicating, by the authorization proxy component in the service grid system which acts as the proxy for the first service, with the second service.

15. The method according to claim 9, wherein the computing cluster is provided as a plurality of computing clusters, the first service and the second service are deployed in different computing clusters, and the first service is deployed in a virtual machine, the second service is deployed in a container.

16. A node device, comprising a memory and a processor, wherein the memory is used for storing a computer program, and the processor is coupled with the memory and used for executing the computer program to:

acquire, based on an identity registration service and an identity customization service provided for each service in a computing cluster system, diversified identity metadata corresponding to a first service;

generate, according to the diversified identity metadata corresponding to the first service, a security policy and a digital certificate for the first service;

in a case where the first service needs to communicate with a second service, perform identity authentication for the first service according the security policy and the digital certificate for the first service; and in a case where the first service passes the identity authentication, communicate, by an authorization proxy component in a service grid system which acts as a proxy for the first service, with the second service; wherein the first service is any one service in the computing cluster system, and the second service is another service different from the first service.

17. The node device according to claim 16, wherein the processor is used for executing the computer program to:

receive an identity registration request initiated for the first service, acquire, from the identity registration request, a first identity metadata corresponding to the first service; and acquire, from a specified metadata storage object, a second identity metadata customized by a user for the first service; wherein the first identity metadata and the second identity metadata form the diversified identity metadata corresponding to the first service.

18. The node device according to claim 16, wherein the processor is used for executing the computer program to:

provide a declarative API for a user;

receive security policy requirement description information submitted by the user through the declarative API; and generate the security policy for the first service according to the security policy requirement description information and the diversified identity metadata.

19. The node device according to claim 18, wherein the processor is used for executing the computer program to:

receive the diversified identity metadata, perform standardization processing for the diversified identity metadata, and store the diversified identity metadata after standardization processing to an identity information base;

receive the security policy requirement description information submitted by the user through the declarative API; generate the security policy for the first service according to the security policy requirement description information and the diversified identity metadata; and in a case where a certificate issuance request has been received, acquire the diversified identity metadata from the identity information base; generate the digital certificate for the first service according to the diversified identity metadata.

* * * * *